Feb. 16, 1965  R. D. JESSEE  3,170,107
CONTROLLED FREQUENCY ALTERNATING CURRENT SYSTEM
Filed May 2, 1960  3 Sheets-Sheet 1
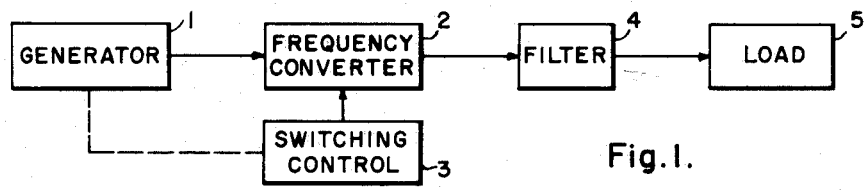
Fig.1.
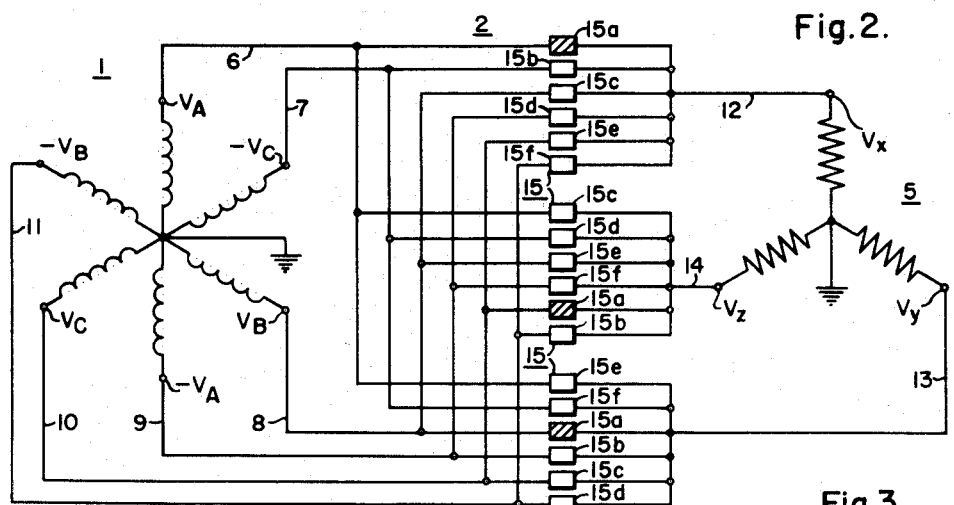
Fig.2.
Fig.3.
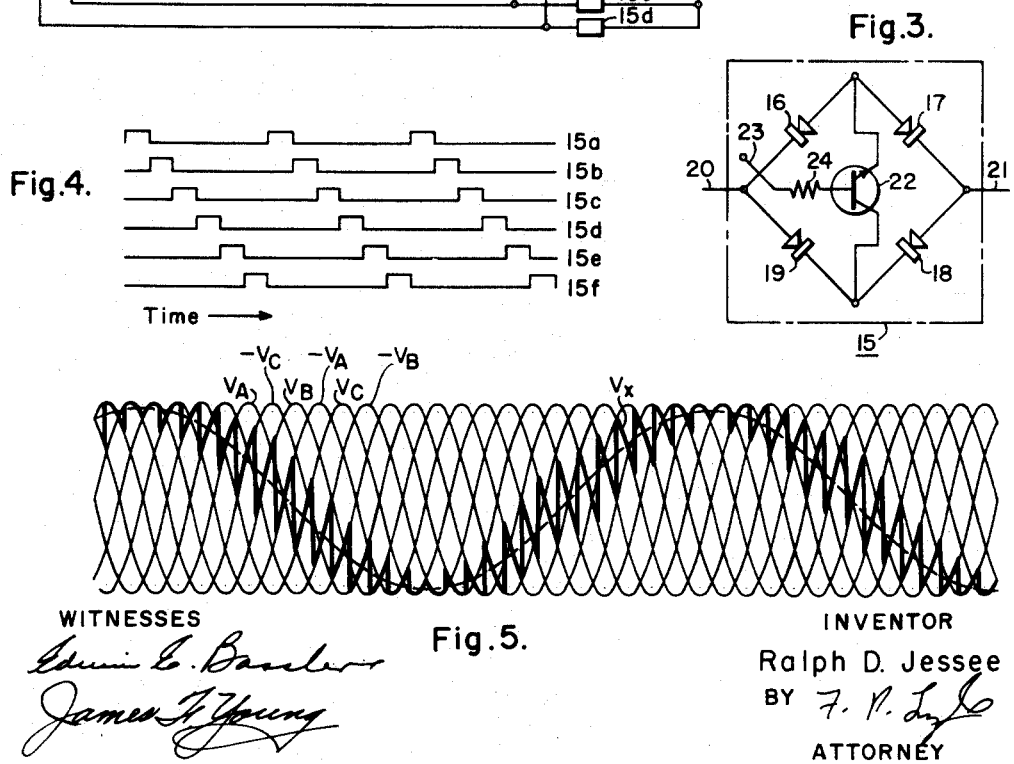
Fig.4.
Fig.5.
WITNESSES
INVENTOR
Ralph D. Jessee
BY
ATTORNEY

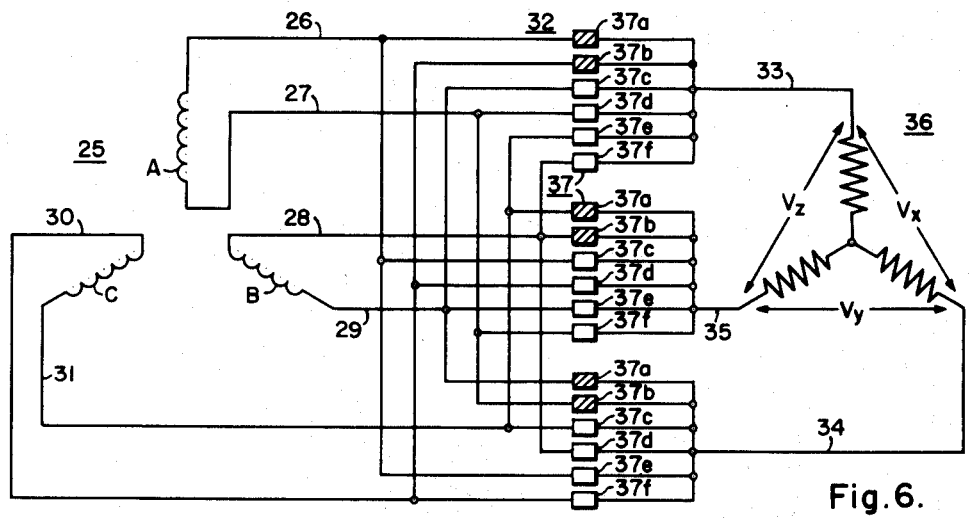
Fig. 6.
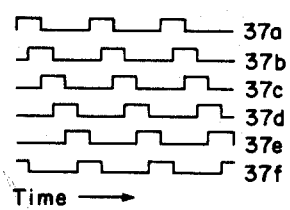
Fig. 7.
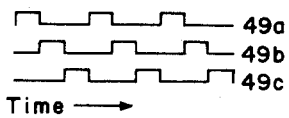
Fig. 9.
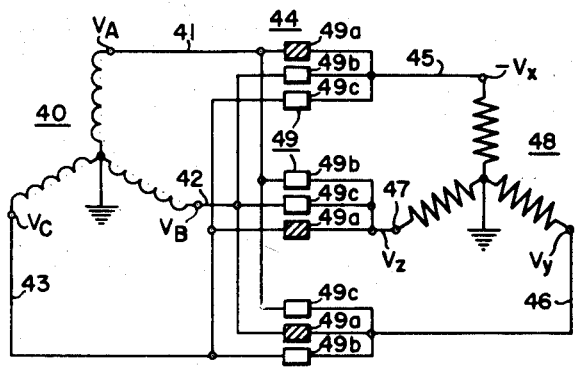
Fig. 8
Fig. 10.
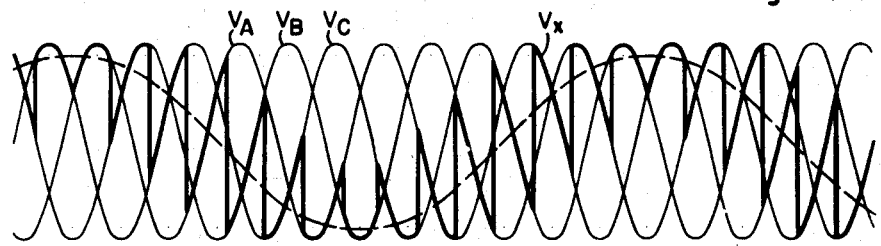

Feb. 16, 1965 R. D. JESSEE 3,170,107
CONTROLLED FREQUENCY ALTERNATING CURRENT SYSTEM
Filed May 2, 1960 3 Sheets-Sheet 3

United States Patent Office 3,170,107
Patented Feb. 16, 1965

3,170,107
CONTROLLED FREQUENCY ALTERNATING CURRENT SYSTEM
Ralph D. Jessee, Lima, Ohio, assignor to Westinghouse Electric Corporation, East Pittsburgh, Pa., a corporation of Pennsylvania
Filed May 2, 1960, Ser. No. 25,985
19 Claims. (Cl. 321—61)

The present invention relates to a constant frequency alternating current power system, and more particularly to a system utilizing a static frequency converter for obtaining a constant or controlled frequency output from a polyphase source of different or variable frequency.

In alternating current power supply systems, a constant frequency output is normally required to supply the load and this is usually obtained from an alternating current generator driven at constant speed to generate constant frequency alternating current. In some cases, however, it is not possible to drive the generator at constant speed, and since the frequency varies with the speed, a variable frequency output results. In aircraft electrical systems, for example, the generator is normally driven from a main engine of the airplane, and if the generator is directly driven from the engine, the speed of the generator varies with the engine speed and the output frequency varies accordingly. Since a constant frequency is required, some means must be provided for obtaining a constant frequency output even though the speed of the prime mover varies. This has usually been done heretofore in aircraft systems by means of a constant speed drive, which is a hydraulic or mechanical variable ratio transmission interposed between the engine and the generator to obtain a substantially constant speed of the generator by changing the ratio of the transmission as the engine speed changes. These constant speed drives are complicated devices requiring frequent maintenance, and they are relatively heavy and bulky so that they are undesirable for aircraft use where weight and size must be kept to a minimum. Furthermore, these constant speed drives, being mechanical devices, are not capable of maintaining the frequency constant with sufficient accuracy for many purposes since some variation in speed of the generator necessarily occurs.

Systems utilizing frequency conversion devices of various types have also been proposed for obtaining a constant frequency output from a variable speed generator, but these systems, and other constant frequency systems that have been devised, have been found to be impractical or undesirable for various reasons, usually because an excessive amount of excitation power is required. A simple and reliable means of high efficiency for obtaining a constant frequency output from a variable frequency source is therefore needed, since no satisfactory system or device for this purpose has been available heretofore.

The principal object of the present invention is to provide an alternating current power system in which a constant frequency, or controlled frequency, output is obtained from a variable speed generator in a simple and reliable manner without any of the disadvantages of previously proposed systems.

Another object of the invention is to provide an alternating current power system in which a static frequency converter is utilized to convert the output of a polyphase source to alternating current of a different and constant frequency.

A further object of the invention is to provide a static frequency converter of high efficiency utilizing static switching devices to connect the output leads of the converter to each phase of a polyphase source in succession, in such a manner that an alternating current output is obtained having a frequency which is readily controllable by controlling the frequency of operation of the switching devices, so that an accurately constant output frequency is easily obtainable.

A still further object of the invention is to provide a static frequency conversion system in which semiconductor switching devices are utilized to connect the output leads to each phase of a polyphase source in succession, in such a manner that an alternating current output is obtained having a frequency which is controllable by controlling the frequency of operation of the switching means, and in which a simple control device is provided to control the switching frequency in such a manner that the output frequency is always equal to a constant or controlled reference frequency.

A more specific object of the invention is to provide an alternating current power system in which the output of a polyphase generator, which may be of variable frequency, is applied to a frequency converter using static switching devices for connecting the output leads of the converter to each phase of the generator in succession in such a manner that the output frequency of the converter is equal to the difference between the generator frequency and the switching frequency, and in which a simple control device is provided for controlling the switching frequency so that it is always equal to the sum of the generator frequency and of a constant reference frequency, to make the final output frequency always exactly and accurately equal to the reference frequency.

The invention will be more fully understood from the following detailed description, taken in connection with the accompanying drawing, in which:

FIGURE 1 is a block diagram illustrating the general arrangement of the system;

FIG. 2 is a schematic diagram showing the circuit connections of a typical embodiment of the invention;

FIG. 3 is a diagram illustrating a static switching device suitable for use in the circuit of FIG. 2;

FIG. 4 is a diagram illustrating the switching sequence of the circuit of FIG. 2;

FIG. 5 is a representation of the input and output wave forms of the circuit of FIG. 2;

FIG. 6 is a schematic diagram showing another embodiment of the invention;

FIG. 7 is a diagram showing the switching sequence of the circuit of FIG. 6;

FIG. 8 is a schematic diagram illustrating still another embodiment of the invention;

FIG. 9 is a diagram showing the switching sequence of the circuit of FIG. 8;

FIG. 10 is a representation of the input and output wave forms of the circuit of FIG. 8;

Figure 11:
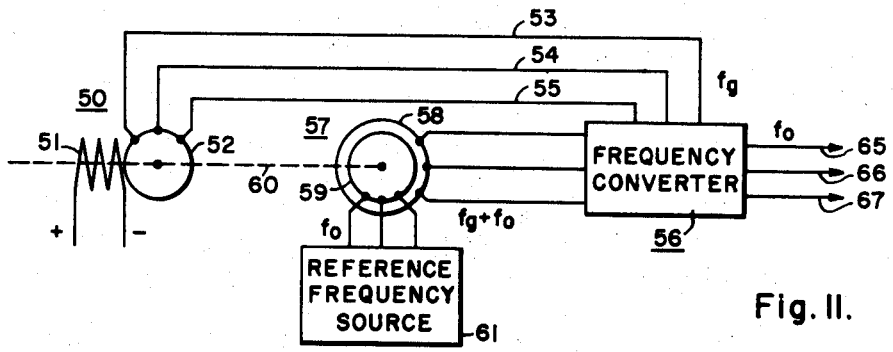
FIG. 11 is a schematic diagram illustrating a preferred switching control means for the static frequency converter of the invention.

As previously indicated, the present invention provides means for obtaining a constant or controlled frequency output from a source of different or variable frequency. The general arrangement of a complete alternating current system is illustrated by the block diagram of FIG. 1. As there shown, the system includes an alternating current generator 1 which may be driven by a prime mover at a variable speed, or in any desired manner, and which in the broadest aspect of the invention represents any polyphase source of alternating current of either variable or constant frequency.

The output of the generator 1 is supplied to a static frequency converter 2 which converts the output of the generator to alternating current of constant controlled frequency different from the generator frequency. The operation of the frequency converter 2 is controlled by a control means 3 which supplies control current or control signals to effect operation of the switching devices of the frequency converter at the necessary frequency to obtain the desired output frequency. The control means 3 may be of any suitable type, as more fully described below, which will supply the proper control current to obtain the desired output frequency, and which may be controlled in response to the generator frequency, as indicated by the dotted connection, or in any other suitable manner. The output of the frequency converter 2 will in general contain high frequency components which may be undesirable and a filter 4 is preferably provided to eliminate the high frequency components. The output of the filter 4 which is supplied to the load 5 is a constant frequency alternating current of sinusoidal wave form, and its frequency is maintained accurately constant by the operation of the frequency converter 2 regardless of changes or variations in the frequency of the generator 1.

An illustrative embodiment of the frequency converter 2 is shown in FIG. 2, the generator 1 and load 5 also being shown and the switching control and filter being omitted to avoid unnecessary complication of the drawing.

The generator 1 is shown as a six phase generator having six windings displaced from each other as illustrated and connected to leads 6, 7, 8, 9, 10 and 11, respectively, which constitute the input leads of the frequency converter 2. The generator 1 is shown as being star connected with the neutral point grounded, and the terminal voltages to ground of the six phases are designated as $V_A$, $V_B$, $V_C$, etc., as shown.

The load 5 is shown as a three phase load with grounded neutral and is connected to the output leads 12, 13 and 14 of the frequency converter 2. The output voltages to ground at each terminal of the load are designated by $V_x$, $V_y$ and $V_z$, respectively. It will be seen that the frequency converter 2 has six input leads corresponding to the phases of the six phase generator, and has three output leads to supply the three phase load.

The frequency converter 2 consists of an array of semiconductor switching devices 15, eighteen switching devices being required for the particular six phase to three phase configuration shown. The switching devices 15 may be any suitable type of static device which is capable of being switched on and off at high frequency and which has bilateral conductivity. A suitable type of switching device 15 is shown in FIG. 3. The device there shown consists of four diodes 16, 17, 18 and 19 connected in a bridge circuit with terminal leads 20 and 21 connected to opposite corners of the bridge. The emitter and collector of a transistor 22 are connected across the other two corners of the bridge, as shown, and a control lead 23 is provided for applying a control signal through a suitable impedance 24 to the base of the transistor 22.

The transistor 22 is shown as an NPN transistor and permits current flow between collector and emitter when a positive control signal is applied to the base. In the absence of a control signal, or if the base is negative, the transistor 22 is nonconductive and the diodes block current flow in either direction between the terminal leads 20 and 21. When a positive control signal is applied to the base of the transistor 22, however, it becomes conductive and current can flow in either direction through the switching device 15. Thus, if the terminal 20 is positive, for example, current can flow through the diode 19, transistor 22 and diode 17 to the terminal 21. If the terminal 21 is the positive terminal, current can flow through the diode 18, transistor 22 and diode 16 to the terminal 20. Thus, the device has bilateral conductivity since current can flow equally well in either direction when a control signal is applied. Current flow is blocked in the absence of the proper control signal, so that the device is capable of functioning as a switch, and it can operate at high frequency because it is a static device utilizing only semiconductor devices.

It will be understood, that instead of a transistor any other type of solid state device might be utilized in the circuit of FIG. 3 which is capable of blocking current flow in either direction in the absence of a control signal and which becomes conductive when a suitable control signal is applied. In general, the switching device 15 may be any type of static device which blocks current flow in the absence of a control signal and which permits current to flow in either direction when a control signal is applied, and which is capable of being switched at sufficiently high frequency to permit the type of operation described hereinafter.

The connections of the switching devices 15 in the frequency converter 2 are illustrated in FIG. 2, the switching devices 15 being shown diagrammatically for simplicity although it will be understood that each of the switching devices may be of the type shown in FIG. 3. As shown in FIG. 2, there are three groups of switching devices 15 and each group is connected to one of the output leads 12, 13 and 14. Each group of switching devices 15 consists of six switching devices connected individually to the six input leads 6, 7, 8, 9, 10 and 11, respectively, and all connected to one output lead. The six switching devices of each group are designated 15a, 15b, 15c, 15d, 15e and 15f, the correspondingly designated switching devices of each of the three groups being operated simultaneously. Thus, the arrangement of the switching devices is such that each output lead of the frequency converter can be connected to any one of the input leads which are connected to the different phases of the six phase generator 1.

In operation, the switching devices 15 are controlled so that each output lead of the frequency converter 2 is connected to each input lead in succession in a predetermined sequence. The switching sequence is illustrated in FIG. 4 which shows the switching order of the six switching devices of each group, the pulses representing the conductive periods for each switch. This figure obviously may also be considered as representing the positive pulses of control current applied to each switch to make it conductive.

If it is assumed that at some instant the three switching devices 15a are conducting, as indicated by the shading in FIG. 2, it will be seen that the output lead 12 is connected to input lead 6, the output lead 13 is connected to input lead 8, and the output lead 14 is connected to input lead 10. Thus, the three terminals of the load are connected to three phase voltages of the generator 120° apart. At the next switching instant, the switches 15a become non-conductive and the switches 15b are made conductive. The output lead 12 is now connected to input lead 7, output lead 13 is connected to input lead 9, and output lead 14 is connected to input lead 11. Thus, each output lead is connected to the next phase of the generator 60° from the phase to which it was previously connected. At the next switching instant, the switches 15b become nonconductive and the switching devices 15c are made conductive, to connect the output leads to the next succeeding input leads, and so on throughout the switching sequence. The output leads 12, 13 and 14 are thus each connected to each of the input leads in succession and thus to the corresponding phases of the generator 1.

The effect of this switching operation is illustrated in FIG. 5 which shows the six phase voltages of the generator 1. The line-to-ground voltage $V_x$ at the output lead 12 is shown by the heavy line in FIG. 5, and it will be seen that this consists of successive portions of each of the six generator phase voltages, each being applied to the output lead 12 for equal successive periods of time. The output voltage $V_x$ is seen to be an essentially sinusoidal voltage containing high frequency components, and the fundamental component of the voltage $V_x$ has been shown by a dashed line in FIG. 5. It will be seen that the frequency of the output voltage $V_x$ is lower than the frequency of the generator and that the wave form has high frequency components of relatively low magnitude which can readily be filtered out. The output voltage $V_x$ only has been shown in FIG. 5, to avoid confusion of the drawing, but it will be apparent that the voltages $V_y$ and $V_z$ are exactly similar to the voltage $V_x$ and displaced therefrom 120° and 240°, respectively.

It can be shown that the voltage $V_x$ may be expressed by the following equation:

$$V_x = \frac{3E}{\pi} \cos(\alpha - \beta + 60°) - \tfrac{1}{5}\cos(5\alpha + \beta - 60°) + \tfrac{1}{7}\cos(7\alpha - \beta + 60°) - \ldots$$

where $\alpha$ is proportional to the switching frequency, $\beta$ is proportional to the generator frequency, and $E$ is the maximum value of the sinusoidal generator voltage.

Similarly, $$V_y \frac{3E}{\pi} = \cos(\alpha - \beta + 180°) - \tfrac{1}{5}\cos(5\alpha + \beta - 180°) + \tfrac{1}{7}\cos(7\alpha - \beta + 180°) - \ldots$$

$$V_z = \frac{3E}{\pi}\cos(\alpha - \beta - 60°) - \tfrac{1}{5}\cos(5\alpha + \beta + 60°) + \tfrac{1}{7}\cos(7\alpha - \beta - 60°) - \ldots$$

Inspection of these equations shows that the fundamental frequency of the output voltages of the frequency converter is equal to the difference between the switching frequency and the generator frequency. The output frequency therefore can readily be controlled by controlling the frequency of switching, and the output frequency can be held constant irrespective of variations in the generator frequency by controlling the switching frequency to maintain a constant difference between the switching frequency and the generator frequency.

This may be done by any suitable type of switching control 3 which maintains the desired difference between the generator frequency and switching frequency, one very desirable type of control means being described hereinafter. Any other suitable type of control might also be used. Thus, the switching control may include any suitable type of frequency sensitive circuit which senses the generator frequency or output frequency and controls a local oscillator circuit or multivibrator to provide a control current of the desired frequency for operation of the switching devices 15 by applying positive pulses to the control terminals 23 in the proper sequence. Similarly, a frequency sensing circuit could be used to control the output frequency of a static inverter supplied from any suitable direct current source to provide a control current of the desired frequency for the switching devices 15. It will be apparent to those skilled in the art that various control arrangements of these general types are possible and could be used to control the switching frequency and provide signal current pulses to the terminals 23 of the switching devices at the proper frequency. It will be understood, therefore, that the invention is not limited to any particular control arrangement and that any desired means may be utilized for actuating the switching devices 15 at a frequency such that a constant difference is maintained between the switching frequency and the generator frequency.

The high frequency components of the output voltage of the frequency converter are usually undesirable, but since their frequency is quite high compared to that of the fundamental they can readily be eliminated by filtering, as indicated in FIG. 1. Thus, for example, if the desired output frequency is 400 cycles per second and if the frequency of the generator is 1600 cycles per second, the switching frequency can be made either 2000 cycles per second or 1200 cycles per second, so as to differ from the generator frequency by 400 c.p.s. If the switching frequency is 2000 c.p.s., the second term of the voltage equation shows that there is a component of 11,600 c.p.s. frequency while the third term shows a component having a frequency of 12,400 c.p.s. Thus, the lowest undesired frequency is 11,600 c.p.s., which is twenty-nine times the fundamental frequency. If the lower switching frequency of 1200 c.p.s. is chosen, the second term of the voltage equation shows that there will be a component of 7600 c.p.s. and the third term shows a component of 6800 c.p.s. Thus, the lowest undesirable frequency is 6800 c.p.s. which is seventeen times the fundamental frequency.

It is apparent that the lowest high frequency component is so high compared to the fundamental frequency that it is relatively easy to filter out the high frequency components, and a smooth sine wave can be obtained with a relatively simple filter. It will also be seen that it is usually desirable to make the switching frequency higher than the generator frequency to minimize the problem of filtering the high frequency components. It is also desirable to make both the generator frequency and the switching frequency as high as practical, since the higher these frequencies are, the greater will be the frequency of the high frequency components, and the problem of filtering is thus further simplified.

The voltage equations also show another interesting characteristic of the frequency converter which will be important in some applications. Referring to the first term of the voltage equations, if the switching frequency is higher than the generator frequency, that is, if $\alpha$ is greater than $\beta$, the value of $\alpha - \beta$ is positive, and the voltage $V_x$ is 60° ahead of the reference, $V_y$ is 180° ahead of the reference and $V_z$ lags the reference by 60°. The sequence of the output voltages therefore is $V_z$, $V_y$, $V_x$. If, however, the generator frequency is higher than the switching frequency, the value of $\alpha - \beta$ is negative. $V_x$ is then 60° behind the reference, $V_y$ is 180° behind the reference, and $V_z$ is 60° ahead of the reference. The sequence of the output voltages is then $V_x$, $V_y$, $V_z$, which is opposite to the phase rotation in the previous case. Thus, if the generator frequency or the switching frequency changes so that the value of $\alpha - \beta$ changes from positive to negative, or negative to positive, the phase rotation of the output voltages is reversed. This is an important characteristic in some applications of the frequency converter.

It will be seen that a switching frequency converter is provided which is capable of changing a polyphase alternating current input of either constant or varying frequency to a different constant output frequency. This result is accomplished by a relatively simple arrangement of static switching devices which switch the output leads of the converter to the different input leads successively in a predetermined sequence at a controlled frequency in such a manner that the voltage at each output terminal is derived by combining successive portions of the voltages of each phase of the source to obtain an output voltage of different frequency determined by the frequency of switching. In this way a simple and reliable frequency converter is provided which makes it possible to obtain a constant output frequency from a variable frequency source accurately and with high efficiency since the control power required is only the small amount of power necessary to switch the semi-conductor devices.

Another embodiment of the frequency converter is shown in FIG. 6 which is intended for use with a three phase generator having an ungrounded winding. The generator 25 shown in FIG. 6 has three phase windings designated A, B and C respectively. Leads 26 and 27 are brought out from phase A, leads 28 and 29 from phase B, and leads 30 and 31 from phase C. The frequency converter 32 has three output leads 33, 34 and 35 for supplying a three phase load 36, and the line-to-line voltages between the output leads are designated $V_x$, $V_y$ and $V_z$.

The frequency converter 32 consists of an array of eighteen static switching devices 37. The switching devices 37 may be of the type shown in FIG. 3, or they may be any suitable type of static switching device, as described above in connection with FIG. 2. The switching devices 37 are arranged in three groups, each group being connected to one of the output leads. The six switching devices 37 of each group, designated 37a to 37f inclusive, are connected as shown to the respective leads of the generator 25 which constitute the input leads of the frequency converter 32. The arrangement is such that when the correspondingly designated switching devices of the three groups are simultaneously made conductive, in the sequence illustrated by FIG. 7, the output leads of the frequency converter are connected to the various input leads in succession in predetermined sequence.

FIG. 7 illustrates the switching sequence, in the same manner as FIG. 4, and it will be seen that in this embodiment of the invention two switching devices in each group are always conductive at the same time. For example, at a particular instant the shaded switching devices 37a and 37b of each group may be conductive, as shown in FIG. 6. At this time, therefore, the lead 26 of phase A of the generator is connected to output lead 33, and lead 27 is connected to output lead 34, so that the output voltage $V_x$ at that instant is the voltage $V_A$ of phase A. Similarly, the output leads 34 and 35 are connected to leads 29 and 28, respectively, so that the output voltage $V_y$ is the voltage $V_B$, and output leads 33 and 35 are connected to leads 30 and 31, respectively, so that the output voltage $V_z$ is the voltage $V_C$.

At the next switching instant, switching devices 37a become nonconductive and switches 37c are made conductive, switches 37b remaining conductive. Each of the three pairs of output leads is now connected across a different phase of the generator with the relative polarities reversed so that each pair of output leads is energized by a generator voltage displaced 60° from the phase voltage to which it was previously connected. Thus, the output leads 33 and 34 are connected to leads 30 and 31, respectively, so that the output voltage $V_x$ is the generator voltage $-V_C$. Similarly, output leads 34 and 35 are connected to leads 27 and 26, respectively, and output leads 33 and 35 are connected to leads 29 and 28, respectively, so that the output voltage $V_y$ is generator voltage $-V_A$ and output voltage $V_z$ is generator voltage $-V_B$. The switching sequence continues in this manner, as shown by FIG. 7, and it will be seen that each of the three pairs of output leads, 33 and 34, 34 and 35, and 33 and 35, is sequentially connected across successive phase voltages of the generator in such a manner that each pair of output leads is successively energized by generator voltages $V_A$, $-V_C$, $V_B$, $-V_A$, $V_C$, and $-V_B$.

It will be seen that the line-to-line output voltages of the frequency converter 32 in this arrangement are the same as the line-to-ground output voltages of the frequency converter of FIG. 2 and the output voltages are defined by the equations given above. Thus, the arrangement of FIG. 6 produces the same output wave form as that shown in FIG. 5, and provides an output frequency which is equal to the difference between the switching frequency and the generator frequency, as explained previously. The control for the switching devices 37 has been omitted in FIG. 6, for clarity of illustration, but it is to be understood that any suitable control means may be provided for effecting operation of these switches in the desired sequence and at the proper frequency, as explained above in connection with FIG. 2.

Each of the embodiments of the invention shown in FIGS. 2 and 6 requires an array of eighteen switching devices. In some cases, a lesser number of switching devices would be desirable and the embodiment of FIG. 8 shows an arrangement for use with a three phase generator which requires only nine switching devices. In this figure there is shown a three phase generator 40 with grounded neutral and having three leads 41, 42 and 43 with terminal voltages to ground designated $V_A$, $V_B$ and $V_C$. The leads 41, 42 and 43 are the input leads of the frequency converter 44 which has three output leads 45, 46 and 47 for supplying a three phase load 48, the respective line-to-ground voltages being designated $V_x$, $V_y$ and $V_z$.

The frequency converter 44 consists of three groups of switching devices 49 with each group connected to one of the three output leads. As before, the switching devices 49 may be any suitable type of static switching device, such as that illustrated in FIG. 3. The three switching devices of each group are connected to the three input leads 41, 42 and 43, respectively, and the corresponding switching devices of each group, designated 49a, 49b and 49c, are simultaneously operated. The sequence of operation of the switching devices is shown by FIG. 9, and the operation of the switching devices may be controlled by any suitable control means, as previously described.

In operation, if the three switches 49a, for example, are conductive at a given instant, as indicated by the shading in FIG. 8, the output lead 45 is connected to input lead 41, output lead 46 is connected to input lead 42, and output lead 47 is connected to input lead 43. At the next instant the switches 49a become nonconductive and switches 49b are made conductive. The output lead 45 is then connected to input lead 42, output lead 46 is connected to input lead 43, and output lead 47 is connected to input lead 41. The switching sequence continues, as shown in FIG. 9, so that each output lead is connected to each input lead in succession. The effect of this is illustrated in FIG. 10 which shows the three phase generator voltages $V_A$, $V_B$ and $V_C$. As the output lead 45, for example, is connected successively to each of these phase voltages in rotation, for equal time intervals, an output voltage $V_x$, shown by the heavy line in FIG. 10, is obtained. It will be seen that this is essentially a sine wave of lower frequency than the generator frequency and containing high frequency components, the fundamental component being shown by the dash line in FIG. 10. Similar output voltages $V_y$ and $V_z$ are also obtained, displaced 120° and 240° respectively from the voltage $V_x$, but these have not been shown in FIG. 10 to avoid confusion of the drawing.

It can be shown that the voltage $V_x$ of FIG. 10 is defined by the following equation:

$$V_x = \frac{3\sqrt{3E}}{2\pi} \cos(\alpha - \beta - 60°) + \frac{1}{2}\cos(2\alpha + \beta - 120°) +$$
$$\frac{1}{4}\cos(4\alpha - \beta - 60°) + \frac{1}{5}\cos(5\alpha + \beta - 120°) +$$
$$\frac{1}{7}\cos(7\alpha - \beta - 60°) + \frac{1}{8}\cos(8\alpha + \beta - 120°) + \ldots$$

Similar equations can be obtained for the voltages $V_y$ and $V_z$. It will be seen from this equation that, as before, the fundamental frequency of the output voltage of the frequency converter is equal to the difference between the switching frequency and the generator frequency, and can thus be controlled and maintained constant by suitably controlling the switching frequency as previously explained in connection with FIG. 2.

Examination of the equation also shows that the output voltage of the converter of FIG. 8 contains the same high frequency components as the output voltage of the circuit of FIG. 2, and also contains additional lower frequency components as shown by the second and third terms of the equation. For this reason, a more elaborate filter must be used with the circuit of FIG. 8 to obtain a pure sine wave but this additional complication is offset by the reduced number of switching devices required. For some applications where a good sine wave voltage is not required the circuit of FIG. 8 may be used without filtering with a considerable reduction in cost and complication as compared to the circuit of FIG. 2. For applications where an accurately sinusoidal wave form is necessary, the circuit of FIG. 8 obviously requires a more complicated and larger filter than that of FIG. 2, and the choice between the two circuits would be determined by whether the more elaborate filter is less objectionable than the greater number of switches and somewhat more complicated switching control required by the circuit of FIG. 2.

As indicated in FIG. 1 and previously described, the switching devices of the converter circuits may be controlled by any suitable means, one such control system comprising means for sensing the output frequency or the generator frequency and for utilizing a signal obtained from the sensing means to control the frequency of a switching signal current obtained from a suitable source such as a local oscillator or an inverter. An arrangement of this type, however, has certain disadvantages since it depends for operation on an error in the frequency sensed, and attempts to restore it to the desired value. This is essentially a feedback type of control and is subject to stability problems.

Figure 12:
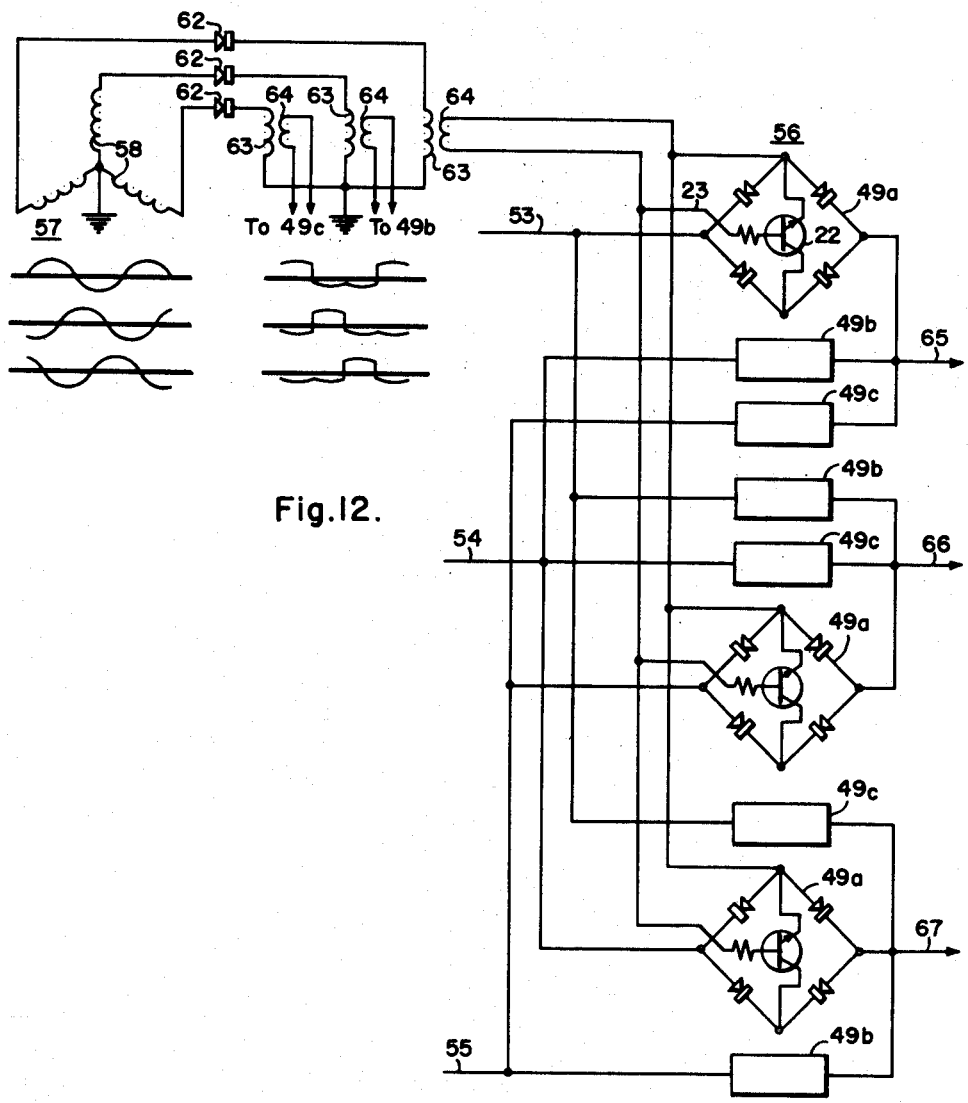
FIG. 12 is a schematic diagram illustrating the manner in which the control means of FIG. 11 is applied to the control of the converter circuit of FIG. 8.

A different type of switching control means for the frequency converter which is not subject to these disadvantages is shown in FIGS. 11 and 12. This control means is shown in the drawing applied to the type of frequency converter shown in FIG. 8 although it will be obvious that it is equally applicable to the other embodiments of the invention described.

The switching control is shown diagrammatically in FIG. 11 in a system including a generator 50 which is shown as a three phase generator and corresponds to the generator 40 of FIG. 8. The generator 50 has a field winding 51 excited with direct current and has a three phase armature winding diagrammatically indicated at 52 with output leads 53, 54 and 55 which are the input leads of the frequency converter 56. The frequency converter 56 may be of the type shown in FIG. 8 and is supplied with three phase alternating current at a generated frequency $f_g$, which may be variable if the generator 50 is driven by its prime mover at varying speed.

As previously explained, the output of the frequency converter has a frequency equal to the difference between the switching frequency and the input frequency. It is necessary, therefore, to provide for switching the converter at the necessary frequency to obtain the desired constant output frequency. For this purpose, there is provided a control machine 57 which is a dynamoelectric machine having the physical construction of a conventional wound rotor induction machine, and which can be of quite small size since it supplies only the small amount of power required for actuating the switching devices. The control machine 57 has a three phase winding 58 on its stator and has a three phase winding 59 on its rotor. The windings 58 and 59 are preferably designed to have the same number of poles as the generator 50. The rotor of the control machine 57 is preferably mounted on the same shaft as the generator 50, as indicated at 60, or it may be driven in any other desired manner at the same speed as the generator 50.

A reference frequency source 61 is also provided. The reference source 61 may be any suitable polyphase source of accurately constant frequency, or of accurately controllable frequency, and since it is required only to supply the excitation for the machine 57, its output is quite low and it can be any suitable type of local oscillator or other circuit in which the frequency can be accurately determined. The frequency $f_0$ of the reference source 61 is made equal to the desired output frequency and it is connected to supply exciting current to the three phase winding 59 of the rotor of the control machine 57.

The rotor winding 59 is thus excited with alternating current of constant frequency, and since it is a polyphase winding, a rotating field is produced which rotates relative to the rotor at a speed determined by the exciting frequency and the number of poles. If the rotor were stationary, this rotating field would induce in the stator winding 58 a voltage of the same frequency $f_0$. Since the rotor is driven at the same speed as the generator 50, however, the field of the rotor rotates with respect to the stator at a speed equal to the generator speed plus that corresponding to the reference frequency $f_0$. The machine 57 has the same number of poles as the generator 50 and is driven at the same speed, and the voltage induced in the stator winding 58 will therefore have a frequency equal to the generator frequency plus the reference frequency.

The control current taken from the stator winding 58 is thus a polyphase current of frequency equal to $f_g+f_0$. This control current is applied to the frequency converter 56 to effect operation of the switching devices at the frequency of the control current. Since the output frequency of the frequency converter 56, as explained previously, is equal to the difference between the switching frequency and the generator frequency, the output frequency will be equal to the difference between the control current frequency and the generator frequency. The output frequency, therefore, will be equal to $(f_g+f_0)-f_g$, which equals $f_0$. The arrangement described, therefore, controls the switching frequency in such a manner that the output frequency of the converter is always exactly equal to the reference frequency, and its accuracy is equal to the accuracy of the reference frequency. In this way a very simple and reliable control is provided.

It will be obvious that the rotating field of the rotor winding 59 might be made to rotate in the direction opposite to the direction of rotation of the rotor and the frequency of the control current would then be the difference between the generator frequency and the reference frequency. The switching frequency would then be less than the generator frequency but the difference would still be equal to $f_0$ and the output frequency of the converter would be the same, although with opposite phase rotation, as previously explained. The switching frequency derived from the machine 57, therefore, is to be regarded as the algebraic sum of the generator frequency and the reference frequency.

The control current obtained from the control machine 57 may be utilized to control the operation of the switching devices of the frequency converter in any desired manner. One suitable arrangement is shown in FIG. 12 applied to a frequency converter 56 of the type shown in FIG. 8. The three phase output current of the stator winding 58 of the machine 57, which has a sinusoidal wave form as indicated in FIG. 12, is applied through three diodes 62 to the primary windings 63 of a three phase transformer. The voltages induced in the secondary windings 64 of the transformer are then of the form shown in FIG. 12, being positive for 120° of each cycle and negative for 240°. The three voltages are displaced from each other by 120°, as shown, and it will be seen by reference to FIG. 9 that this provides control currents of the wave form necessary for control of the switching devices, since positive pulses of 120° duration are provided and the pulses of the three phases are displaced from each in the necessary manner. The switching devices 49 of the frequency converter 56 have been given the same designations as in FIG. 8, to facilitate understanding, and the control currents obtained from the transformer windings 64 are applied to the control terminals 23 of the switching devices. One of the transformer windings 64 is connected to the three switches 49a, as shown, to operate them simultaneously and the other two windings 64 are similarly connected to the switches 49b and 49c, respectively, so that the switching devices operate to connect each of the output leads 65, 66 and 67 to the input leads in succession, as previously described.

It will be apparent that the output current of the control machine 57 might be utilized in any other suitable manner to control the switching devices. Thus, for example, the control generator 57 might be provided with three times as many poles as the generator and the reference frequency made equal to three times the desired output frequency. The output voltage of the control machine 57 would then be supplied to a conventional ring-of-three counting circuit which produces a positive output pulse for every three positive input pulses, giving an output frequency of one-third the input frequency which would be the desired frequency for controlling the switches of the frequency converter. A counter circuit of this type has an output which is positive for 120° and negative for 240°, which is necessary type of output, and by providing three such outputs suitably displaced in phase the necessary control signals for the switching devices are readily obtained. It will be evident that any other suitable means for applying the output of the control machine 57 to actuate the switching devices might be utilized.

The switching control of FIGS. 11 and 12 provides an open loop type of control which accurately determines the output frequency and which avoids the disadvantages of a feedback type of control. The effect of the control machine 57 is to add a constant reference frequency to the generator frequency, to obtain the control current, and since the output frequency of the converter is always equal to the difference between the generator frequency and the switching frequency, the output frequency will always be accurately equal to the reference frequency. Since the control machine 57 is required to provide only the small amount of power necessary for switching the semiconductor devices of the frequency converter, it can be of very small size and could readily be made integral with the main generator 50. The reference frequency source has to supply only the excitation power for the control machine 57, and since this is an extremely small quantity, the reference frequency source may be any desired type of low power oscillator, or other low power source, and can be made very accurately controllable so that the output frequency can be maintained at the desired constant value with high accuracy. This type of control can, of course, be applied to any of the embodiments of the frequency converter by providing the necessary number of phases on the machine 57.

It should now be apparent that an alternating current power system has been provided which makes it possible to obtain an accurate constant frequency output from a variable speed generator, or other variable frequency source. This is done in a very simple and reliable manner by means of a static frequency converter utilizing semiconductor switching devices. Such a system can be made quite compact and is highly reliable since it has no moving parts, other than the generator itself. A high frequency generator and high switching frequency can be utilized, to obtain highly accurate output frequency and to minimize filtering problems, since the semiconductor devices utilized are capable of switching at extremely high speed. It is also to be noted that the system is very efficient since no larger excitation power is required for the frequency conversion and the only control power needed is that necessary to switch the semiconductor devices which is quite small. The semiconductor devices used are capable of use in bilateral switching circuits, such as that shown in FIG. 3, which is advantageous because operation is thus possible over a wide range of load power factors as the switching devices are capable of permitting current flow with low impedance in either direction.

A further advantage is that the frequency control is effected by switching the semiconductor devices at a very much higher rate than would be possible with any type of mechanical device so that any frequency transients that may occur upon change in the generator speed are extremely small and of very brief duration. This is an important consideration in many applications where the load devices require very accurate frequency. The use of static devices of course also has the usual advantages of high As previously indicated, any suitable means may be used for controlling the switching frequency to obtain the desired output frequency and any such control means is within the scope of the invention. A particularly suitable control arrangement has been shown and described in detail, however, since this arrangement is particularly advantageous because of its simplicity and accuracy, and because it makes possible the use of a highly accurate frequency reference and avoids the stability problems inherent in a feedback type of control. Any suitable type of control might be used, however, and in some instances a very simple frequency control may be satisfactory. For example, if the frequency converter is to be used only for frequency conversion from one constant frequency to a second constant frequency, the switching devices will be switched at a constant frequency and a very simple control circuit could be utilized.

Certain specific embodiments of the invention have been shown and described in detail for the purpose of illustration, but it will be apparent from what has been said that the invention is capable of various other embodiments and modifications and that all equivalent embodiments and modifications are within the scope of the invention.

I claim as my invention:

1. A frequency converter for converting polyphase alternating current of one frequency to alternating current of a different frequency, said converter comprising bilaterally conductive semiconductor switching means for connecting a plurality of polyphase input leads to a plurality of output leads, said switching means being adapted to connect each output lead to each input lead in succession in a predetermined sequence to provide an output frequency equal to the difference between the input frequency and the frequency of operation of the switching means, and means for controlling the frequency of operation of the switching means.

2. A frequency converter for converting polyphase alternating current of one frequency to alternating current of a different frequency, said converter comprising a plurality of bilaterally conductive static switching devices for connecting a plurality of polyphase input leads to a plurality of output leads, said switching devices being arranged to effect connection of each output lead to each input lead in succession in a predetermined sequence to provide an output frequency equal to the difference between the input frequency and the frequency of operation of the switching devices, and means for controlling the frequency of operation of the switching devices.

3. A frequency converter for converting polyphase alternating current of one frequency to alternating current of a different frequency, said converter comprising a plurality of bilaterally conductive static switching devices for connecting a plurality of polyphase input leads to a plurality of output leads, said switching devices being arranged to effect connection of each output lead to each input lead in succession in a predetermined sequence to provide an output frequency equal to the difference between the frequency of said source and the frequency of operation of the switching means, and control means for effecting operation of the switching devices and for controlling the frequency of switching.

4. A frequency converter for converting polyphase alternating current of one frequency to alternating current of a different frequency, said converter comprising switching means for connecting a plurality of polyphase input leads to a plurality of output leads, said switching means including a group of bilaterally conductive static switching devices connected to each output lead, each group of switching devices including switching devices connected to each input lead, means for effecting operation of the switching devices of each group in a predetermined sequence to connect each output lead to each input lead in succession, and means for controlling the frequency of operation of the switching devices.

5. An alternating current power system comprising a polyphase source of alternating current, bilaterally conductive semiconductor switching means for connecting said source to a plurality of output leads, said switching means being adapted to connect each output lead to each phase of the source in succession in a predetermined sequence to provide an output frequency equal to the difference between the frequency of said source and the frequency of operation of the switching means, and means for controlling the frequency of operation of the switching means.

6. An alternating current power system comprising a polyphase source of alternating current, bilaterally conductive semiconductor switching means for connecting said sources to a plurality of output leads, said switching means being adapted to connect each output lead to each phase of the source in succession in a predetermined sequence to provide an output frequency equal to the difference between the frequency of said source and the frequency of operation of the switching means, and control means for effecting operation of the switching means and for controlling the frequency of operation of the switching means to maintain a predetermined constant difference between the frequency of the source and the switching frequency.

7. An alternating current power system comprising a polyphase source of alternating current, a plurality of bilaterally conductive static switching devices for connecting said source to a plurality of output leads, and means for controlling said switching devices to connect each output lead to each phase of the source in succession in a predetermined sequence at a frequency different from the frequency of the source to provide an output frequency equal to the difference between the frequency of the source and the frequency of switching.

8. An alternating current power system comprising a polyphase source of alternating current, a plurality of bilatrally conductive static switching devices for connecting said source to a plurality of output leads, and means for controlling said switching devices to connect each output lead to each phase of the source in succession in a predetermined sequence, and for controlling the frequency of operation of the switching devices to maintain a predetermined constant difference between the frequency of the source and the switching frequency.

9. An alternating current power system comprising a polyphase source of alternating current, a plurality of bilaterally conductive static switching devices for connecting said source to a plurality of output leads, and a source of control current of controlled frequency connected to effect operation of said switching devices to connect each output lead to each phase of the source in succession in a predetermined sequence to provide an output frequency equal to the difference between the frequency of said alternating current source and the frequency of said control current.

10. An alternating current power system comprising a polyphase source of alternating current, a plurality of bilaterally conductive static switching devices for connecting said source to a plurality of output leads, a source of control current connected to effect operation of said switching devices to connect each output lead to each phase of the source in succession in a predetermined sequence to provide an output frequency equal to the difference between the frequency of said alternating current source and the frequency of said control current, and means for controlling the frequency of said control current to maintain a constant difference between the frequency of the source and the frequency of operation of the switching devices.

11. An alternating current power system comprising a polyphase source of alternating current, switching means for connecting said source to a plurality of output leads, said switching means comprising a group of bilaterally conductive static switching devices connected to each output lead, each of said groups including switching devices connected to each phase of the source, and means for effecting operation of the switching devices in a predetermined sequence to connect each output lead to each phase of the source in succession at a controlled frequency.

12. An alternating current power system comprising a polyphase source of alternating current, switching means for connecting said source to a plurality of output leads, said switching means comprising a group of bilaterally conductive static switching devices connected to each output lead, each of said groups including switching devices connected to each phase of the source, and means for effecting operation of the switching devices in a predetermined sequence to connect each output lead to each phase of the source in succession and for maintaining a constant difference between the frequency of operation of the switching devices and the frequency of the source.

13. An alternating current power system comprising a polyphase source of alternating current, switching means for connecting said source to a plurality of output leads, said switching means comprising a group of bilaterally conductive static switching devices connected to each output lead, each of said groups including switching devices connected to each phase of the source, a source of control current connected to effect operation of the switching devices in a predetermined sequence to connect each output lead to each phase of the source in succession, and means for controlling the frequency of said control current to maintain a constant difference between the frequency of the source and the frequency of operation of the switching devices.

14. An alternating current power system comprising a polyphase source of alternating current, a plurality of bilaterally conductive static switching devices for connecting said source to a plurality of output leads, and control means for effecting operation of said switching devices in a predetermined sequence to connect each output lead to each phase of the source in succession, said control means including means for supplying a control current at a frequency equal to the sum of the frequency of the source and of a constant reference frequency to effect successive operation of the switching devices at the frequency of the control current.

15. An alternating current power system comprising a polyphase source of alternating current, a plurality of bilaterally conductive static switching devices for connecting said source to a plurality of output leads, and control means for effecting operation of said switching devices in a predetermined sequence to connect each output lead to each phase of the source in succession, said control means including a source of constant reference frequency, means for generating a control current at a frequency equal to the sum of the frequency of said polyphase source and of said reference frequency, and means for effecting successive operation of the switching devices at the frequency of the control current.

16. An alternating current power system comprising a polyphase alternating current generator, switching means for connecting each of a plurality of output leads to each phase of the generator in succession in a predetermined sequence, a dynamoelectric machine having a stator member and a rotor member driven at the same speed as said generator, polyphase windings on the stator member and on the rotor member, means for exciting one of said windings with alternating current of constant frequency, and means for supplying a control current from the other of said windings to effect operation of the switching means at the frequency of the control current.

17. An alternating current power system comprising a polyphase alternating current generator, switching means for connecting each of a plurality of output leads to each phase of the generator in succession in a predetermined sequence, and control means for effecting operation of said switching means, said control means including a dynamoelectric machine having a stator member and a rotor member driven at the same speed as said generator, polyphase windings on the stator member and on the rotor member, means for exciting one of said windings with alternating current of constant frequency, and means for deriving a control current from the voltage generated in the other of said windings for effecting operation of the switching means at the frequency of the control current.

18. An alternating current power system comprising a polyphase alternating current generator, a plurality of static switching devices for connecting said generator to a plurality of output leads, and control means for effecting operation of said switching devices in a predetermined sequence to connect each output lead to each phase of the generator in succession, said control means including a dynamoelectric machine having a stator member and a rotor member driven at the same speed as said generator, polyphase windings on the stator member and on the rotor member, means for exciting said rotor winding with alternating current of constant frequency, and means for deriving a control current from the voltage generated in said stator winding and for effecting operation of the switching devices at the frequency of said control current.

19. An alternating current power system comprising a polyphase alternating current generator, switching means for connecting said generator to a plurality of output leads, said switching means comprising a group of static switching devices connected to each output lead, each of said groups including switching devices connected to each phase of the generator, and control means for effecting operation of said switching devices in a predetermined sequence to connect each output lead to each phase of the generator in succession, said control means including a dynamoelectric machine having a stator member and a rotor member driven at the same speed as said generator, polyphase windings on the stator member and on the rotor member, means for exciting said rotor winding with alternating current of constant frequency, and means for deriving a control current from the voltage generated in said stator winding and for effecting operation of the switching devices at the frequency of said control current.

References Cited in the file of this patent

UNITED STATES PATENTS

| | | |
|---|---|---|
| 1,955,524 | Augier et al. | Apr. 17, 1934 |
| 2,442,257 | Boyer | May 25, 1948 |
| 2,534,754 | Boyer et al. | Dec. 19, 1950 |
| 2,707,258 | Boyer et al. | Apr. 26, 1955 |

FOREIGN PATENTS

| | | |
|---|---|---|
| 81,475 | Sweden | Sept. 18, 1934 |
| 1,231,594 | France | Apr. 11, 1960 |